Oct. 16, 1923.
B. C. SMALL
CLUTCH CONTROL AND GOVERNOR
Filed March 1, 1920
1,470,773
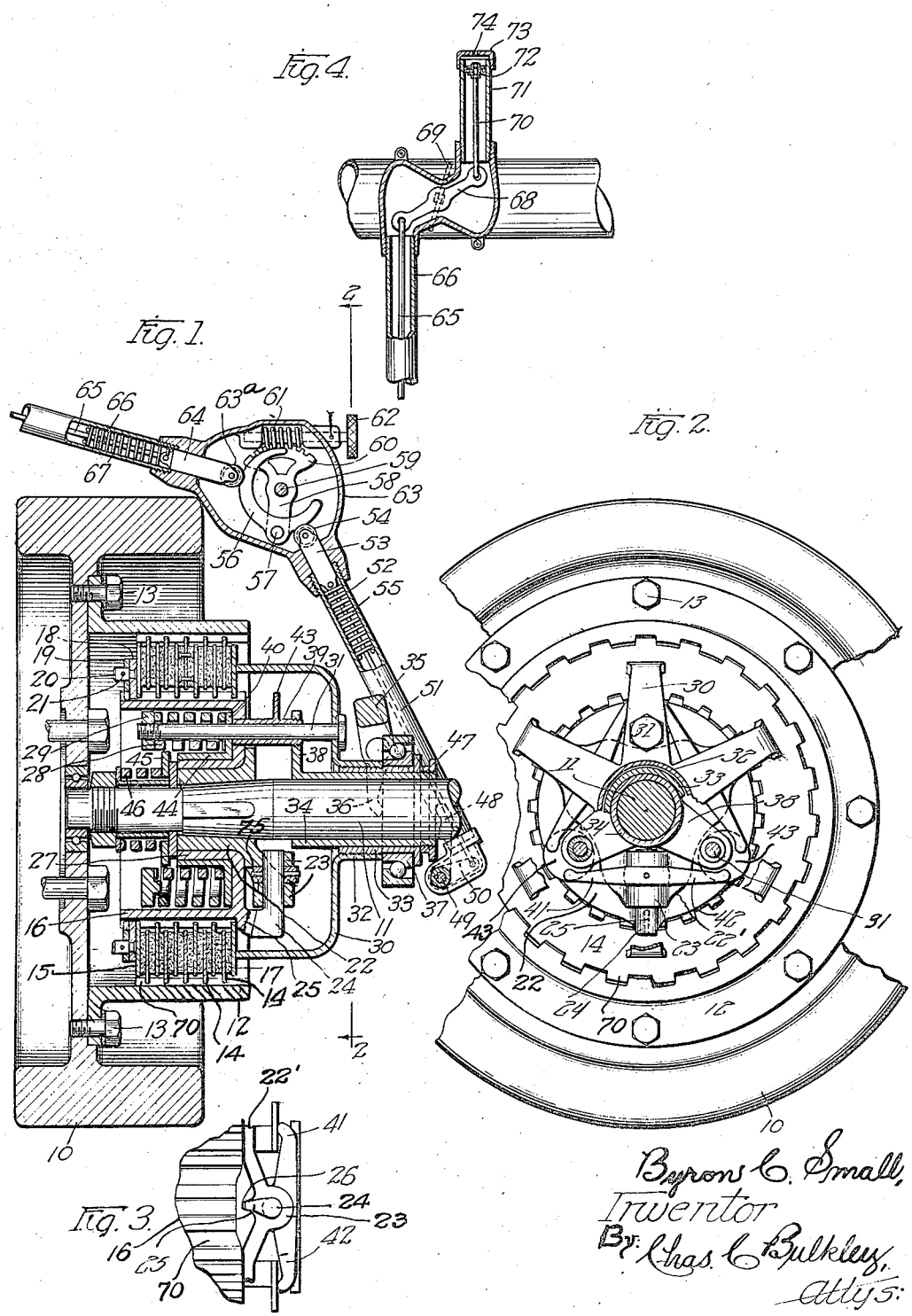
Byron C. Small,
Inventor
By Chas. C. Bulkley,
Attys.

Patented Oct. 16, 1923.

1,470,773

UNITED STATES PATENT OFFICE.

BYRON C. SMALL, OF MORRIS, ILLINOIS.

CLUTCH CONTROL AND GOVERNOR.

Application filed March 1, 1920. Serial No. 362,414.

*To all whom it may concern:*

Be it known that I, BYRON C. SMALL, a citizen of the United States of America, and resident of Morris, Grundy County, Illinois, have invented a certain new and useful Improvement in Clutch Controls and Governors, of which the following is a specification.

My invention relates to an improved clutch control and governor, and has for one of its objects the provision of an improved control whereby when the pull on the engine is increased, the throttle is automatically controlled so as to increase the power developed by the engine. More specifically, the object is to provide means whereby the torsional movement of the driving member with respect to the driven member may be utilized to govern the position of the throttle in the intake pipe of the motor, thus governing the speed at which the motor will run under varying conditions of the load.

A further object of my invention relates to an improved friction clutch in which the spring pressure on the friction disks is increased as the load on the engine increases.

A further object consists of the combination of the governor control and friction clutch into a single unit whereby as the load on the engine increases, the spring pressure on the friction disks is increased and the throttle of the engine automatically controlled so as to increase the power developed by the engine.

These and other features and objects of my invention will be more readily understood by having reference to the accompanying drawings, in which I have illustrated one embodiment of my invention, in which—

Figure 1 is a cross sectional view of an improved clutch and governor mechanism embodying the features of my invention.

Fig. 2 is a partial end and sectional view taken on the line 2—2 of Fig. 1, looking in the direction of the arrows.

Fig. 3 is a detail view of one of the rocking arms.

Fig. 4 is a plan sectional view of the throttle.

In the drawings, I have shown a fly-wheel 10 which is connected in the usual manner to the crank shaft and revolved thereby and a driven shaft 11 which is connected to the fly-wheel 10 through suitable frictional gearing about to be described. A cylindrical outer drum 12 is secured to the fly-wheel by means of bolts 13. The inner surface of this outer drum 12 is provided with a series of notches or teeth as clearly shown in Fig. 2, and fitted into these teeth are a plurality of driving disks 14 provided with corresponding notches or teeth. Alternately arranged between these driving disks 14 are a set of driven disks 15 mounted upon the outer surface of a cylindrical inner drum 16. This inner drum is likewise provided around its exterior surface with a series of projections or teeth 70 and the driven disks 15 provided with corresponding depressions so as to fit over the corresponding projections of the inner drum 16 thereby preventing any rotative movement between the driven disks and the drum 16. Suitable friction material 17 is fastened to the driving disks in the usual manner. In order to hold these disks in position and yet permit the same to be removed from the front or left-hand end, looking at Fig. 1, I provide near the left-hand edge of the drum 16 a continuous groove extending entirely about the circumference of this drum. The locking ring 18 is slipped over the end of the drum 16 until it comes into engagement with this groove, and then rotated sufficiently so that the projections on this locking ring correspond with or are back of the teeth on the outer circumference of the drum 16, so that this ring cannot be withdrawn, and then a locking plate 19 is slipped over a pin 20 which is secured to the locking ring 18, which locking plate is provided with teeth which engage with the teeth on the drum 16 and prevents rotation of the ring 18, this locking member 19 being secured to the pin 20 by the cotter pin 21.

Mounted on the shaft 11, and keyed thereto, there is a cylindrical hub or driven shaft member 22. The member 22 comprises a sleeve portion, to which the numeral 22 is applied in Figure 1, an outwardly extending flange portion to which the numeral 22' is applied in Figure 2, and three bosses 23 which project outwardly to the right as shown in Figure 1 beyond the plane of the web of flange 22'. The bosses 23 are drilled radially to form bearings for rock shafts 24, and s'ots 75, intersect the radial bearings so formed. As illustrated, I have shown three rock shafts 24, although, of course, the number could be varied, but I find the best results are obtained by the construction shown. Each of these rock shafts 24 is provided with a laterally extending portion at its outer end which terminates in a tooth 25 which engages in a corresponding notch 26 in the face of the drum 16 which drum is likewise provided with a hub portion 27 mounted so as to freely rotate on the hub 22. Between the outer ring of the inner drum 16 and the hub portion 27 thereof, there is an annular space within which are mounted the main compression springs 28, the outer ends of which springs bear against a ring 29, which ring is secured to the ordinary pressure plate 30 by means of the bolts 31. This pressure plate is provided with a hub portion 32 which is threaded upon a sleeve 33 loosely mounted upon an inner sleeve 34, likewise slidably mounted upon the shaft 11. This pressure plate 30 is controlled in the usual manner through the medium of a foot-pedal 35, yoke 36, and bearing ring 37, so that this pressure plate can be moved longitudinally along the shaft 11 to thereby vary the friction between the friction disks 15 and 17.

The sleeve 34 is provided with radially extending arms 38 in which are mounted the sleeves 39 which form bearings for the bolts 31. The inner end of these sleeves 39 pass freely through openings in the inner face of the drum 16 and bear against a flange 40 on a sleeve 44 against which the inner end of the spring 28 is seated. Mounted upon each of the rock shafts 24 there is a rocking member consisting of the two arms 41 and 42. Extending outwardly from each of the sleeves 39 on the bolts 31 there are bearing disks 43 which are so located with respect to the arms 41 and 42 that the outer ends of these arms bear against a corresponding bearing disk 43. Thus, as clearly shown in Fig. 2, there are three of these bearing disks and three sets of these rocking arms, two of these arms bearing against each of the disks. When the spring 28 is compressed, the sleeve 44 is adapted to engage with a ring 45 mounted on the reduced end of the shaft 11 and which ring then compresses the auxiliary spring 46 mounted upon this shaft.

The sleeve 34, which is slidably mounted on the shaft 11, is provided at its end with a flange 47 with which a yoke 48 engages. This yoke forms one end of a bell crank lever pivoted at 49, the other end 50 of this bell crank being secured to a rod 51 which passes through a tube 52 and is secured at its opposite end to a bearing member 53 which carries a roller 54. A spring 55 is located within this tubing and exerts a normal pull on the rod 51 so that when the sleeve 34 is moved along the shaft and thus the head of this sleeve 47 moved away from the yoke 48, the spring can then operate to move this rod longitudinally. The roller 54 bears against a sector 56 which is pivotally mounted at 57 on a member 58. This member 58 is pivoted at 59 and is provided with a mutilated worm gear 60 which meshes with a worm 61 controlled by a thumb screw 62, all of which mechanism is located within a suitable housing 63. Likewise, bearing on the sector 58 is a roller 63$^a$ mounted upon a bearing member 64 to which a rod 65 is connected, which rod extends to the throttle. This rod 65 is enclosed in a suitable tubing 66 in which is mounted a spring 67, which spring is of lighter tension than the spring 55, so that this spring 55 can operate in opposition to the spring 67. The opposite end of the rod 65 is connected to a rocking arm 68 which controls the throttle 69. The opposite end of this rocking arm 68 is connected to a rod 70 which extends through a suitable piston casing 71 and carries at its opposite end a piston head 72. The outer end of this casing is closed by a suitable cap 73 within which there is a small air hole 74, this construction forming a dash-pot, so that the rod 70 and piston head 72 is free to move inward, but is retarded in its outward movement.

The operation will be readily apparent from the foregoing description, and is as follows:—The parts as illustrated are in the position they asume when the clutch is released or inoperative and the throttle closed. When, through the medium of the foot-pedal the yoke 36 is moved away from the collar 37, the spring 28 then operates through the rods 31 to draw the pressure plate 30 to the left, as shown in Fig. 1, thus forcing the clutch disks together and producing sufficient friction so that the shaft 11 is caused to revolve with the fly-wheel 10. This movement is transmitted through the friction clutch disks to the inner drum 16 and thence through the three rock shafts 24 to the hub 22 keyed on the shaft. The power being thus transmitted through these pivoted stub shafts 24 tends to produce a rocking movement of these stub shafts which rocks the arms 41 and 42 about these rock shafts as an axis. The greater the pull of the engine, the more these arms 41 and 42 will be rocked. This movement of the arms 41 and 42 causes one of these arms, depending upon the direction in which the power is being transmitted through the clutch, to bear against the corresponding disk 43, thus forcing this disk and the sleeve 39 along the corresponding bolt 31 against the flange 40 to thereby compress the spring 28 and increase the compressing force exerted by this spring on the friction disks. It will thus be seen that as the pull on the engine increases, the compressing force of the spring 28 is correspondingly increased so that a much more effective operation of the clutch is obtained. After the spring 28 has been compressed to a predetermined extent, the sleeve 44 is forced into engagement with the ring 45 which thus brings into operation the auxiliary spring 46 which prevents undue compression of this spring 28. This same rocking movement of the levers 41 and 42 likewise causes the sleeve 34 to be slid along the shaft 11, thereby moving the collar 47 away from the yoke 48 so that the spring 55 is free to move the rod 51 longitudinally to rock the sector 56, which movement is then transmitted through the roller 63$^a$ and rod 65 to the throttle to open the same. That is, as the pull on the engine increases, the throttle is automatically opened so as to increase the power developed by the engine. The extent to which this throttle is thus opened can be readily adjusted by means of the worm 61 operated by the thumb-screw 62. Through this means the mutilated worm gear 60 can be rotated so as to vary the position of the pivot pin 57 of the sector 56. It will be seen that if this pivot pin is located half-way between the roller 54 and the roller 63$^a$ that a given movement of the roller 54 will produce an equal movement of the roller 63$^a$. If, however, the pivot pin 57 is adjusted so that it is nearer the roller 54 than the roller 63$^a$, then a given movement of the roller 54 will produce a greater movement of the roller 63$^a$ and thus an increased opening of the throttle. This is due to the fact that the roller 54 will be operating upon the short arm of the compound lever formed by this pivoted sector. In a corresponding manner if the pivot pin is adjusted in the other direction so that it is nearer to the roller 63$^a$ than to the roller 54, then a given movement of the roller 54 will produce a smaller movement of the roller 63$^a$, thus producing a lesser opening of the throttle. In this way the extent to which the throttle is opened can be controlled, and thus the speed of the engine governed.

When the clutch is released—that is, moved to disengaged or inoperative position through the operation of the foot-pedal,—the pressure-plate 30 is forced to the right, thus releasing the pressure on the clutch disks, and the springs 28 operate to return the sleeves 39 to their normal position, thus returning the sleeve 34 and rocking levers 41 and 42 to their normal position. The movement of the sleeves 34 rocks the bell crank lever formed by the yoke 48 and arms 50 so as to pull downward on the rod 51 against the compression of the spring 55 to thus withdraw the roller 54 from the sector 56. The roller 63$^a$ which is held against this sector 56 by means of the pressure developed by the spring 67, tends to rock this sector back to normal position and would do so immediately, thus closing the throttle 69, were it not for the delayed action caused by the dash-pot. It is important that the closing of the throttle be thus delayed, as otherwise this throttle would be closed so quickly that the engine would be slowed down at the time the gears were shifted, instead of being speeded up, which is necessary when shifting into a lower gear. With the dash-pot, however, the closing of the throttle is sufficiently delayed so that when the clutch is released and the power thus taken off the engine, the clutch is held open sufficiently to permit the engine to be speeded up so that the gears can be shifted before the spring 67 operates to close the throttle.

In the specific embodiment of my invention illustrated, I have shown the governor control and friction clutch as a unitary structure, but it will, of course, be understood that these features can be employed separately, in which event in the governor control mechanism the drum 16 would become the driving drum or member, and the sleeve 22 the driven member. Where the governor was thus separate, of course, the pressure plate 30 and the bolts 31 would be necessarily omitted, the ring 29, against which the springs 28 rest, in this event being suitably supported against lateral movement on the driven shaft.

It will be seen that I have devised a very efficient structure in which the torsional movement of the driving member with respect to the driven member is employed to automatically control the throttle so that as the load on the engine increases, the power developed by the engine correspondingly increases. Furthermore, it will be seen that I have provided very simple and efficient means whereby the extent to which the throttle is opened, due to any increased load on the engine, may be readily adjusted, and thus an efficient governor is obtained for governing the speed of the engine under varying conditions of load. It will also be seen that the spring pressure exerted on the frictional disks is increased as the load on the engine increases, thus preventing any tendency of the clutch to slip under conditions of heavy load and allowing at the same time such decreased spring pressure under conditions of very light load or at the period of first engagement of the friction disks that the clutch action will be smooth and not harsh or jerky. The decreased spring pressure upon the friction surfaces at the point of initial engagement of those surfaces will furthermore materially lessen the power needed to disengage the clutch, and thus tend toward a much longer life of the thrust bearing which forces the pressure plate away from engagement with the friction disks when the clutch pedal is depressed.

While I have illustrated my governor control in connection with a certain type of friction clutch, it will be understood that I do not wish to be limited to the use of the exact form of clutch shown, as my governor control is adapted for use with other types of friction clutches in which spring means are employed to force the friction surfaces into close contact. It will likewise be understood that other changes and modifications may be made without departing from the spirit and intent of my invention.

What I claim as my invention is:—

1. The combination of a driving member, a driven member, friction means through which power is transmitted to said driven member, means permitting independent torsional movement of said driving member with respect to said driven member, the extent of such movement depending upon the load on the engine, and means continually under pressure controlled by said torsional movement for increasing the pressure in said friction means, and for increasing the power supplied to said driving member.

2. The combination of a driving member, a driven member, a plurality of frictional disks through which power is transmitted to said driven member, spring means for forcing said disks into frictional engagement, means dependent upon the load on the engine for permitting a varying amount of torsional movement of said driving member with respect to said driven member, means continually under pressure controlled by said torsional movement for increasing or decreasing the spring pressure between the plates and for varying the amount of power supplied to said driving member.

3. The combination of a driving member, a driven shaft member, means for supplying power to said driving member through friction means, a sleeve keyed to said driven member and carrying one or more pivotally mounted radially extending shafts, connections between the outer ends of said shafts and said driving member whereby rotation of said driving member causes rotation of said shafts, spring means for limiting the movement of said shafts, and means controlled by said movement for increasing the pressure in said friction means and for increasing the power supplied to said driving member.

4. The combination of a driving member, a driven shaft member, means for supplying power to said driving member through friction means, a sleeve keyed to said driven member and carrying one or more pivotally mounted radially extending shafts, connections between the outer ends of said shafts and said driving member whereby rotation of said driving member causes rotation of said shafts, spring means for limiting the movement of said shafts, means controlled by said movement for increasing the pressure in said friction means, a throttle, a sleeve mounted upon said driven member, means controlled by the movement of said shafts for sliding said sleeve along said driven member, and connections from said sleeve to said throttle whereby said movement controls said throttle to thereby vary the power supplied to said driving member.

5. The combination of a driving member, a driven shaft member, a sleeve mounted on said driven shaft, means whereby the load on said driven member causes said sleeve to be moved along said shaft, a throttle, connections from said sleeve to said throttle, whereby movement of said sleeve controls said throttle, means for adjusting the extent of movement of said throttle for a given movement of said sleeve, said means consisting of a pivoted member, connections from one arm of said member to said sleeve and from the other arm to said throttle, and means for varying the pivotal point of said member.

6. The combination of a driving member, a driven shaft member, a sleeve mounted on said driven shaft, means whereby the load on said driven member causes said sleeve to be moved along said shaft, a throttle, connections from said sleeve to said throttle, whereby movement of said sleeve controls said throttle, means for adjusting the extent of movement of said throttle for a given movement of said sleeve, said means consisting of a circular sector pivoted at an intermediate point, one arm of said sector being connected to said sleeve and the other arm being connected to said throttle, and means for rocking said sector about a central pivot to thereby vary the position of its pivotal point to thereby vary the extent of movement of said throttle for a predetermined movement of said sleeve.

7. The combination of a driving member, a driven shaft member, a sleeve mounted on said driven shaft, means whereby the load on said driven member causes said sleeve to be moved along said shaft, a throttle, connections from said sleeve to said throttle, whereby movement of said sleeve controls said throttle, means for adjusting the ratio of movement of said throttle to the movement of said sleeve, and means for retarding the closing movement of said throttle.

8. The combination of a motor, a driving member, a driven member, a plurality of frictional disks through which power is transmitted to said driving member, a spring operating upon compression to force said disks into frictional engagement, means dependent upon the load on the driven member for varying the compression of said spring, whereby an increased load increases said compression to thereby increase the frictional engagement between said disks, an auxiliary spring for opposing the compression of said first-mentioned spring, means for bringing said auxiliary spring into operation upon a predetermined compression of said first-mentioned spring, means for varying the power generated by said motor, and an operative connection between said means for varying the compression of said spring and said means for varying the power generated by said motor.

9. In combination, two shafts, a motor operatively connected to one of said shafts, coacting friction clutch members secured to said shafts, adjustable means continually under pressure for exerting pressure between said friction members, and means operated by rotation of either of said shafts in excess of the rotation of the other shaft to increase the pressure between said friction members and to vary the power generated by said motor.

10. In combination, two shafts, a motor operatively connected to one of said shafts, coacting friction members secured to said shafts, spring-operated means continually under pressure for setting up pressure between said friction members, and means operated by rotation of either of said shafts in excess of the rotation of the other shaft to increase the pressure exerted by said spring-operated means, and to vary the power generated by said motor.

Signed by me at Chicago, Illinois, this 25th day of February, 1920.

BYRON C. SMALL.